UNITED STATES PATENT OFFICE.

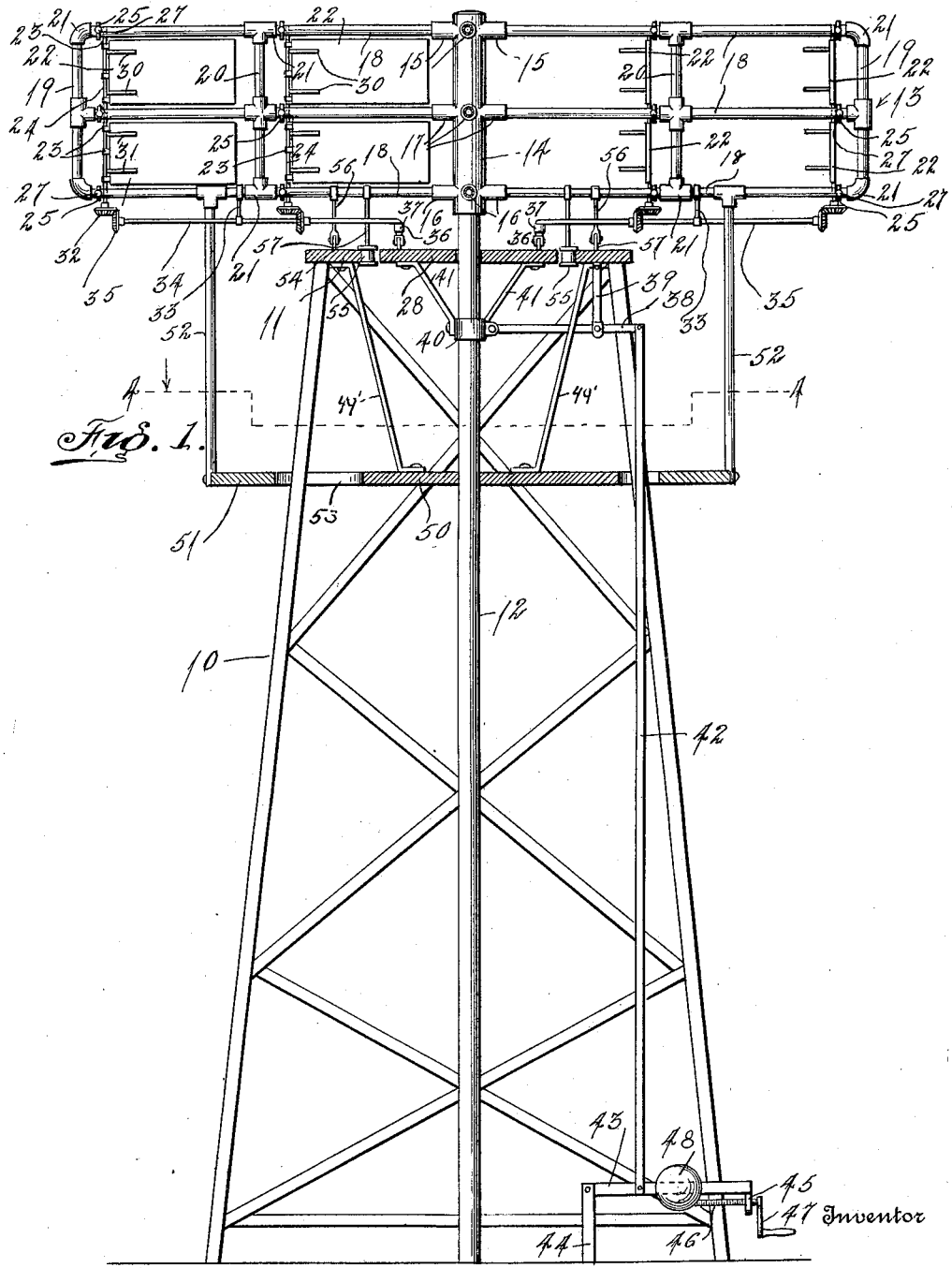

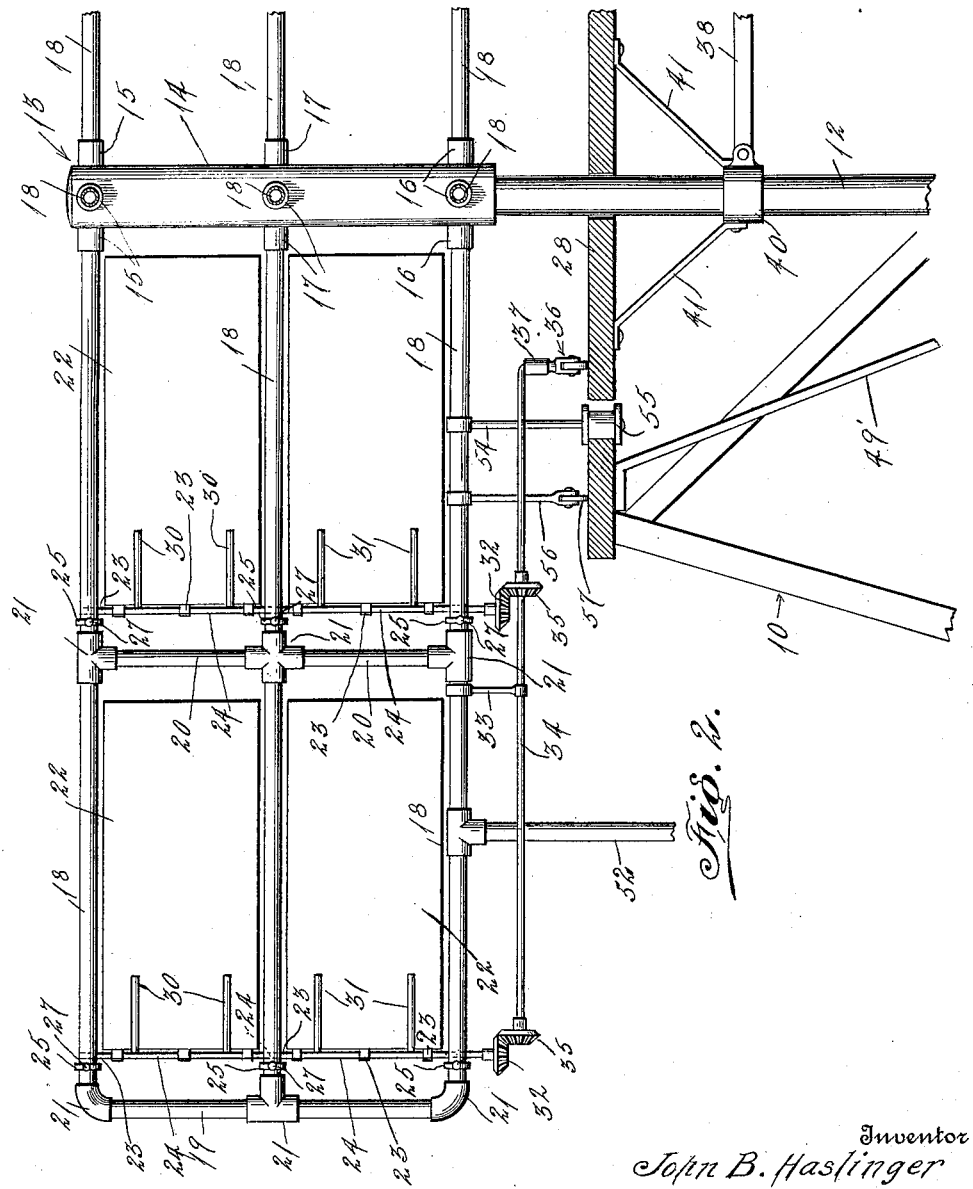

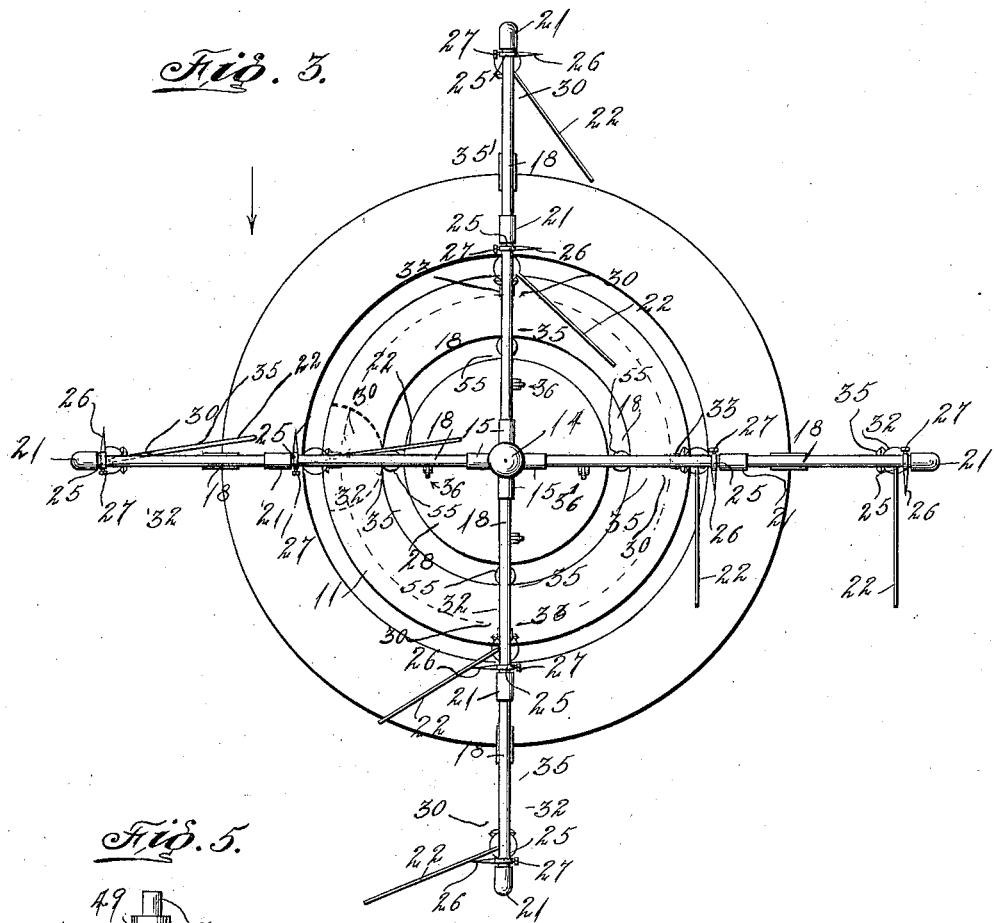
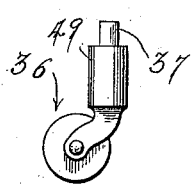
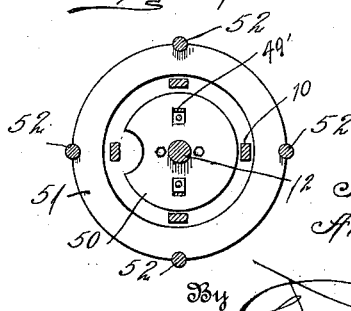

JOHN B. HASLINGER AND ANTHONY HASLINGER, OF FREMONT, OHIO.

WINDMILL.

1,036,109. Specification of Letters Patent. Patented Aug. 20, 1912.

Application filed December 8, 1910. Serial No. 596,296.

*To all whom it may concern:*

Be it known that we, JOHN B. HASLINGER and ANTHONY HASLINGER, citizens of the United States, residing at Fremont, in the county of Sandusky, State of Ohio, have invented certain new and useful Improvements in Windmills; and we do hereby declare the following to be a full, clear, and exact description of the invention, such as will enable others skilled in the art to which it appertains to make and use the same.

This invention relates to improvements in that class of wind mills known as horizontal mills.

The object of this invention is to provide a novel means for regulating the speed of a wind mill, this means permitting of the wheel being throttled in an abnormally strong breeze.

Another object is to provide a novel means for permitting repairs being made to the wind wheel without shutting down the latter.

With the above objects in view, the invention consists of the novel details of construction and combination of parts hereinafter fully described and claimed.

In the accompanying drawings forming part of this specification, Figure 1 is a side elevation of a wind mill constructed in accordance with our invention. Fig. 2 is an enlarged cross section of the wind wheel and regulator mechanism. Fig. 3 is a plan view of the wind wheel with the regulator frames open. Fig. 4 is a cross section taken on the line 4—4, Fig. 1. Fig. 5 is a detail view in elevation of the crank caster.

Referring now to the drawings, the reference character 10 designates the wind mill derrick. This derrick is provided at its top with an annular stationary platform 11 and a line shaft 12 is disposed centrally within the derrick and platform and has its lower end connected to a pump mechanism (not shown) and its upper end connected to the wind wheel 13 forming the subject matter of this invention.

The wind wheel consists of a tubular bearing 14 which snugly fits upon the upper end of the line shaft 12 and is rigidly fixed thereto. This tubular bearing is provided at its upper and lower ends with radial series of internally threaded sockets 15 and 16 and is further provided with a centrally located series of threaded sockets 17. These sockets are arranged in vertical alinement and receive the threaded extremities of rods 18. The outer ends of each vertical series of rods are connected by a rod 19, and the central portions by a cross rod 20. The rods 18, 19 and 20 are preferably formed from ordinary pipe and are joined together at their meeting by ordinary elbows 21. It will be seen that four compartments are formed between each vertical series of rods 18 and in these compartments are located deflector boards 22 which will be presently described. It will be seen by referring to the drawings that the radial arms together with the deflector boards present four wings and as each of these wings together with its deflector board regulating mechanism are exactly identical in construction, it will be necessary to describe but one of the wings.

The deflector boards are each formed from a single plate of metal, wood or similar material, and are provided at one end with hinge eyes 23 which encircle stand rods 24 journaled in the rods 18. The hinge eyes of the deflector boards are arranged remote from the tubular bearing 14 so that the free ends of the boards may be thrown outward by centrifugal force when the wheel is rotated by the wind, this swinging outward of the free ends of the boards permitting of the boards feathering to the wind so as not to cause a drag upon the wheel when the boards are disposed upon the lee side of the wheel during the latter's rotation. To prevent the boards making a complete revolution upon their gudgeons when advancing into the windward side of the wheel, a plurality of stops are arranged upon the rods 18 adjacent the gudgeons of the boards, each of these stops consisting of a ring 25 of sufficient size to snugly encircle the rod 18 and a finger 26 projecting obliquely from the ring, this finger engaging the board broadside when the latter swings outward to approximately a right angle to the rod and preventing the further rotation of the board upon its gudgeons. These stops are secured in position by means of set screws 27 or similar fasteners. Slidingly fitted upon the line shaft 12 is a circular cam platform 28 which is disposed approximately in the plane of the before mentioned stationary platform 11 and is capable of being elevated above and depressed below the plane of this platform.

The cam platform 28 actuates mechanism for regulating the angular disposition of the deflector boards relatively to the rods 18. The regulating mechanism comprises the above mentioned stand rods 24 journaled in suitable bearings formed in the lower and intermediate radial bars 18 and engaging the hinge eyes of the deflector boards. These rods 24 are each provided with a pair of horizontal arms 30 which project in the direction of the gudgeons of the upper deflector boards and are further provided with a pair of horizontal arms 31 which project in the direction of the gudgeons of the lower deflector boards. These horizontal arms engage the deflector boards broadside when the latter are in closed position, or in other words, when the latter are in vertical alinement with the rods 18. It will thus be seen that the rods 24 together with their lateral arms limit the closing movement of the deflector boards. The lower ends of the rods 24 project below the lower rod 18 and are equipped with bevel gears 32. Secured to the lower rod 18 by means of a hanger 33 is a horizontally disposed shaft 34 having a pair of bevel gears 35 which mesh with the bevel gear 32. That end of the shaft 34 which is disposed adjacent the line shaft 12 is equipped with a caster 36, the shank 37 of this caster being curved in outline and performing the function of a crank.

It is now evident that as the platform 28 rises the shaft 34 will be rotated through the instrumentality of the crank caster 36 and will rotate the rods 24. This rotation of the rods 24 through the instrumentality of the arms 31 swings outward the deflector boards 22 and the extent to which these deflector boards are moved outwardly by the arms 30 corresponds in a degree to the distance the platform 28 is elevated above its normal plane, by normal meaning the plane in which the platform is disposed when the deflector boards are in closed position. It is evident that the greatest area that the wheel can present to the breeze is presented when the boards are in closed position, and when the boards are swung outwardly to any angular position relatively to the rods of the wings that there will be spaces in the wings through which the breeze can escape without performing any work. When the breeze is blowing a gale, the platform 28 may be elevated so that the deflector boards 22 are open to a considerable extent, thus permitting of a considerable open space in each wing through which the breeze may escape without imparting movement of the wind wheel.

For throttling the wind wheel described, we provide a lever 38 which is disposed horizontally below the platform 28 and is fulcrumed on the ends to a hanger 39 carried by the platform 11. One end of the lever 38 is pivotally connected to a collar 40 which loosely fits the line shaft 12. A pair of inclined brace bars 41 have their upper extremities bolted or otherwise secured to the bottom face of the platform 28 and their lower ends bolted or otherwise secured to the collar 40. The opposite end of the lever is pivotally connected to a connecting link 42 which extends downward through the derrick and terminates adjacent the ground. The lower end of the connecting link is pivotally connected to a lever 43 which is fulcrumed at one end to a post 44 fixed in the ground or in the support upon which the derrick rests. The opposite end of the lever 43 is provided with a lug 45 having a central threaded aperture through which a worm 46 is engaged. The worm 46 is equipped at one end with an actuating crank 47 and at its opposite end is fixed to a weight 48 which is slidingly mounted upon the lever 43.

By rotating the crank 47, the weight 48 may be slid longitudinally of the lever, the clockwise rotation of the crank operating to advance the weight toward the connecting rod and the counter-clockwise rotation of the crank operating to retract the weight toward the lug 45. The weight when positioned adjacent the lug 45 causes the free end of the lever 43 to rock downward and through the instrumentality of the link 42 and lever 38 causes the platform 28 to rise and close the blades whereby the full power of the breeze is utilized in rotating the wind wheel. When the weight is positioned adjacent the connecting link, the weight of the platform 28 will counterbalance the weight 48 and cause the platform to sink whereby the weight of the crank caster 36 will cause the caster to gravitate with the platform and open the blades to their fullest extent as above described so that no portion of the breeze will be utilized in rotating the wind wheel. It may here be stated that the shank 37 of the caster is weighted as shown at 49 to cause the caster to gravitate when the platform 28 sinks. It is clear that the worm may be actuated so as to dispose the weight 48 in any position intermediate the actuating rod and lug 45 of the lever 43 so that the blades may be inclined any desired angular position relatively to the rods 18 of the wings.

For permitting repairs to be made to the wheel while the latter is in motion, we secure to the annular stationary platform 11 a pair of hangers 49' which carry at their lower ends a stationary circular platform 50, this platform having a central opening to permit of the line shaft 12 projecting therethrough. An annular platform 51 is disposed in the plane of the platform 50 and surrounds the latter, this platform 51 being suspended from the bottom rods 18 of the wind wheel by hangers 52 which are rigidly secured to the wind wheel and platform in any desired manner. The stationary platform is provided with a manhole 53 through which a person may step from the stationary platform to the revolving platform and may easily repair any slight damage to the wind wheel without stopping the latter. For preventing tilting of the wind wheel during rotation a plurality of rods 54 are fixed at their upper ends to the bottom rods of the wheel, these rods 54 being terminally equipped with grooved pulleys 55, which travel on the edge of the circular cam platform 11. For relieving the pulleys 55 of the weight of the wheel, a plurality of rods 56 are fixed to the lower rods of the wheel and are equipped with rollers 57 which travel on the platform 28 and support the wheel thereon.

What is claimed, is:—

1. The combination of a wind wheel having a horizontally swinging deflector board, a stand shaft having a finger engaging and limiting movement of said board, a horizontal shaft having a gear connection with said stand shaft and having a crank, and a vertical movable platform engaging said crank and operating to actuate both of said shafts whereby to move said finger to adjusted positions.

2. The combination with a derrick, of a line shaft, a tubular bearing on said shaft above said derrick having upper, lower and intermediate series of radially extending arms arranged in vertical alinement, deflector boards pivoted near the outer ends of said arms and having their free edges extending toward said bearing, an annular reciprocating platform encircling said line shaft, cam shafts carried by the lowermost series of arms and having roller equipped cranks bearing upon said platform, stand shafts journaled in said arms near the pivots of said deflector boards having fingers bearing upon said deflector boards and limiting swinging movement of the same, and operative connections between said cam shafts and said stand shafts.

In testimony whereof, we affix our signatures, in presence of two witnesses.

JOHN B. HASLINGER.
ANTHONY HASLINGER.

Witnesses:
  ALBERT EILRICH,
  NEVA ROSE.

---

Copies of this patent may be obtained for five cents each, by addressing the "Commissioner of Patents, Washington, D. C."